US012682383B2

(12) United States Patent
Whang et al.

(10) Patent No.: US 12,682,383 B2
(45) Date of Patent: Jul. 14, 2026

(54) AUTO CREATE A SPACE RESERVATION FOR A CUSTOMER CONFIGURATION LAYOUT

(71) Applicant: The Boeing Company, Arlington, VA (US)

(72) Inventors: Chongman Whang, Lynnwood, WA (US); Linda L. Lin, Seal Beach, CA (US); Ephraim Mark De Dios Lapingcao, Everett, WA (US); Linette Sogin Whang, Costa Mesa, CA (US)

(73) Assignee: The Boeing Company, Arlington, VA (US)

( * ) Notice: Subject to any disclaimer, the term of this patent is extended or adjusted under 35 U.S.C. 154(b) by 245 days.

(21) Appl. No.: 18/450,993

(22) Filed: Aug. 16, 2023

(65) Prior Publication Data

US 2025/0061501 A1 Feb. 20, 2025

(51) Int. Cl.
*G06Q 30/06* (2023.01)
*G06Q 30/0601* (2023.01)

(52) U.S. Cl.
CPC ................................ *G06Q 30/0621* (2013.01)

(58) Field of Classification Search
CPC . G06Q 30/0621; G06F 30/15; G06F 2111/20; B64D 11/06
USPC ........................................................ 705/26.5
See application file for complete search history.

(56) References Cited

U.S. PATENT DOCUMENTS 8,060,345 B2 * 11/2011 Lee ........................ B64D 11/00
244/118.6
11,347,903 B2 5/2022 Whang et al.

2006/0106682 A1 * 5/2006 Van Dyck .......... G06Q 30/0641
705/26.5
2007/0233433 A1 10/2007 Lee et al.
2017/0349300 A1 * 12/2017 Senesac .............. G06F 3/04845
2018/0210998 A1 * 7/2018 Gonnsen ................. G06F 30/15
(Continued)

FOREIGN PATENT DOCUMENTS

CN 106570575 A * 4/2017 ............. G06F 30/15
EP 3648042 A1 5/2020
WO WO-2022039097 A1 * 2/2022 ............. G06F 30/20

OTHER PUBLICATIONS

Han Xiaojian, Xie Weihua and Xiao Chun, "A use of quasi-human algorithm on layout of aircraft," 2010 3rd International Conference on Advanced Computer Theory and Engineering(ICACTE), Chengdu, China, 2010, pp. V1-448-V1-451 retrieved from IP. Com on Jun. 13, 2025 (Year: 2020).*

(Continued)

*Primary Examiner* — Yogesh C Garg
(74) *Attorney, Agent, or Firm* — Yee & Associates, P.C.

(57) ABSTRACT

Creating a customer layout configuration of a vehicle is provided. The method comprises pulling, from a customer database, a number of text documents that specify a customer's preferences for the layout configuration. Technical requirements are determined according to a requirement database tool based on the customer preferences. Functional data and logical data are determined according to a system architecture modeling tool based on the customer preferences. A physical layout model of the vehicle is generated according to the customer preferences in the text documents within constraints of the technical requirements, functional data, and logical data.

20 Claims, 10 Drawing Sheets

(56) References Cited

U.S. PATENT DOCUMENTS

| | | | |
|---|---|---|---|
| 2019/0025905 A1 * | 1/2019 | Godina | G06F 3/0488 |
| 2021/0182447 A1 * | 6/2021 | Whang | G06T 19/00 |
| 2021/0380178 A1 * | 12/2021 | Kanitz | B62D 47/003 |

OTHER PUBLICATIONS

J.-B. Lee et al., "Implementation of E-Car System Based on Integrated Prototyping," 2008 International Conference on Advanced Language Processing and Web Information Technology, Dalian, China, 2008, pp. 387-392, retrieved from IP. Com on Oct. 14, 2025 (Year: 2008).*

European Patent Office Extended Search Report, dated Dec. 18, 2024, regarding Application No. EP24191458.9, 11 pages.

Fuchte Clemens: "Enhancement of Aircraft Cabin Design Guidelines with Special Consideration of Aircraft Turnaround and Short Range Operations", Hamburg, Oct. 24, 2015 (Oct. 24, 2015), pp. 1-153, XP093231463, Retrieved from the Internet: URL:https://elib.dlr.de/89599/1/Fuchte%20FB-2014-17%20Version%20Druck.pdf [retrieved on Dec. 9, 2024].

Seeckt Kolja et al: "Kabinenauslegung mit Pacelab Cabin", Hamburg, Nov. 19, 2008 (Nov. 19, 2008), pp. 1-67, XP093231431, Retrieved from the Internet: URL:https://www.fzt.haw-hamburg.de/pers/Scholz/arbeiten/TextSeeckt.pdf [retrieved on Dec. 9, 2024].

* cited by examiner

100

110

600

700

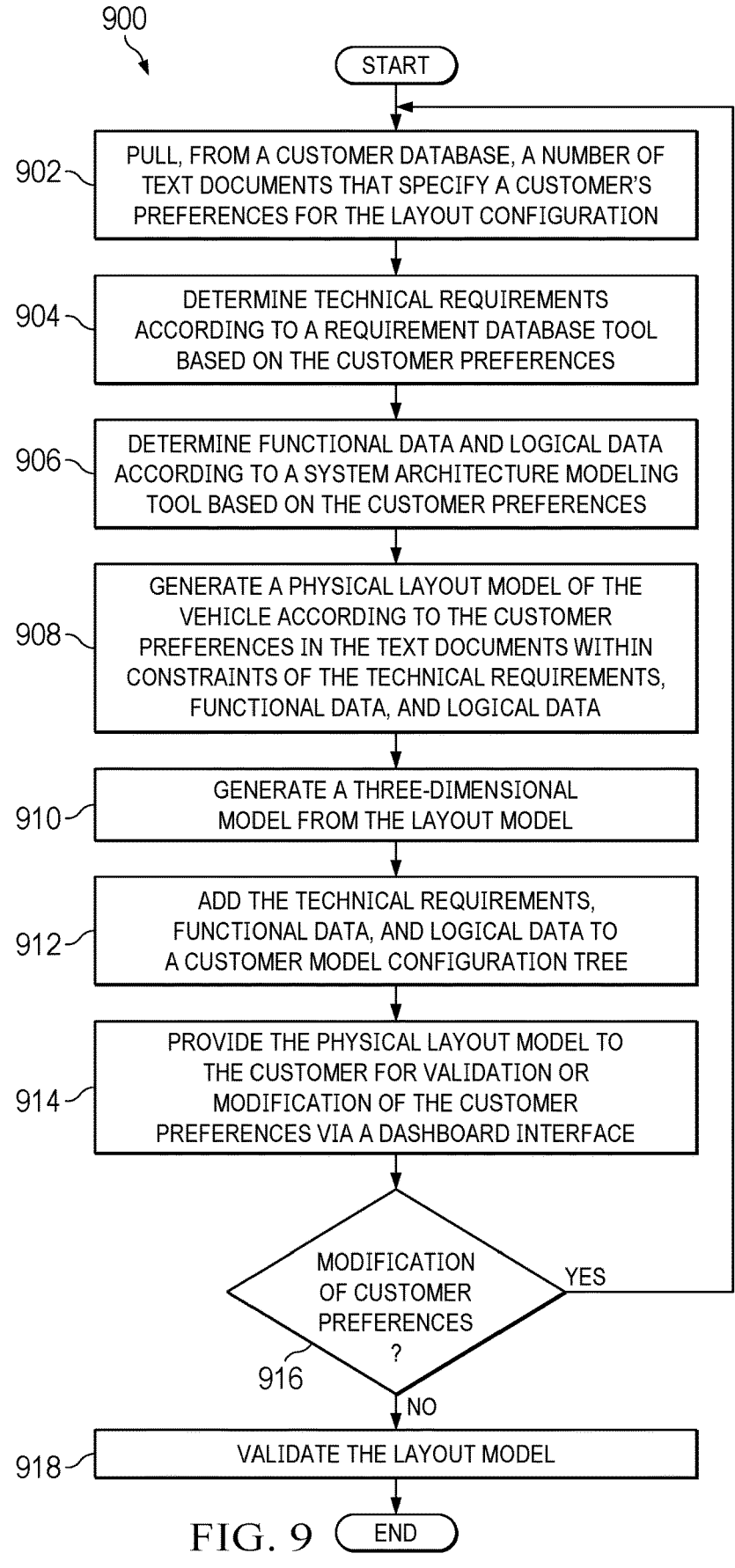

900

START

902 — PULL, FROM A CUSTOMER DATABASE, A NUMBER OF TEXT DOCUMENTS THAT SPECIFY A CUSTOMER'S PREFERENCES FOR THE LAYOUT CONFIGURATION

904 — DETERMINE TECHNICAL REQUIREMENTS ACCORDING TO A REQUIREMENT DATABASE TOOL BASED ON THE CUSTOMER PREFERENCES

906 — DETERMINE FUNCTIONAL DATA AND LOGICAL DATA ACCORDING TO A SYSTEM ARCHITECTURE MODELING TOOL BASED ON THE CUSTOMER PREFERENCES

908 — GENERATE A PHYSICAL LAYOUT MODEL OF THE VEHICLE ACCORDING TO THE CUSTOMER PREFERENCES IN THE TEXT DOCUMENTS WITHIN CONSTRAINTS OF THE TECHNICAL REQUIREMENTS, FUNCTIONAL DATA, AND LOGICAL DATA

910 — GENERATE A THREE-DIMENSIONAL MODEL FROM THE LAYOUT MODEL

912 — ADD THE TECHNICAL REQUIREMENTS, FUNCTIONAL DATA, AND LOGICAL DATA TO A CUSTOMER MODEL CONFIGURATION TREE

914 — PROVIDE THE PHYSICAL LAYOUT MODEL TO THE CUSTOMER FOR VALIDATION OR MODIFICATION OF THE CUSTOMER PREFERENCES VIA A DASHBOARD INTERFACE

916 — MODIFICATION OF CUSTOMER PREFERENCES ?

YES

NO

918 — VALIDATE THE LAYOUT MODEL

FIG. 9        END

AUTO CREATE A SPACE RESERVATION FOR A CUSTOMER CONFIGURATION LAYOUT

BACKGROUND INFORMATION

Technical Field

The present disclosure relates generally to manufacturing, and more specifically to computer-aided modeling systems for manufacturing.

Background

Computer-aided modelling or computer-aided design (CAD) creates virtual models of objects or systems, which allows engineers and designers to visualize and simulate structures or processes. Configuration layouts for vehicles such as aircraft can be customized according to specific customer requirements. For an approved customer configuration each commodity 3D space reservation model is created manually in a CAD too.

SUMMARY

An illustrative embodiment provides a computer-implemented method of creating a customer layout configuration of a vehicle. The method comprises pulling, from a customer database, a number of text documents that specify a customer's preferences for the layout configuration. Technical requirements are determined according to a requirement database tool based on the customer preferences. Functional data and logical data are determined according to a system architecture modeling tool based on the customer preferences. A physical layout model of the vehicle is generated according to the customer preferences in the text documents within constraints of the technical requirements, functional data, and logical data.

Another illustrative embodiment provides a system for creating a customer layout configuration of a vehicle. The system comprises a storage device that stores program instructions and one or more processors operably connected to the storage device and configured to execute the program instructions to cause the system to: pull, from a customer database, a number of text documents that specify a customer's preferences for the layout configuration; determine technical requirements according to a requirement database tool based on the customer preferences; determine functional data and logical data according to a system architecture modeling tool based on the customer preferences; and generate a physical layout model of the vehicle according to the customer preferences in the text documents within constraints of the technical requirements, functional data, and logical data.

Another illustrative embodiment provides a computer program product for creating a customer layout configuration of a vehicle. The computer program product comprises a computer-readable storage medium having program instructions embodied thereon to perform the operations of: pulling, from a customer database, a number of text documents that specify a customer's preferences for the layout configuration; determining technical requirements according to a requirement database tool based on the customer preferences; determining functional data and logical data according to a system architecture modeling tool based on the customer preferences; and generating a physical layout model of the vehicle according to the customer preferences in the text documents within constraints of the technical requirements, functional data, and logical data.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 9 depicts a flowchart of a process for creating a customer layout configuration of a vehicle in accordance with an illustrative embodiment.

DETAILED DESCRIPTION

The illustrative embodiments recognize and take into account that auto CAD systems cannot automatically create three-dimensional (3D) models based on customer configuration tools because the systems are not linked. Therefore, 3D layout models have to be created manually.

The illustrative embodiments provide a method for creating a customer layout configuration of a vehicle by linking a customer configuration with auto CAD using a model-based system engineering that pulls together requirements, functional data, and logical data associated with customer configuration choices. As a result, the illustrative embodiments allow the automatic generation of 2D and 3D physical models based on text documents provided by the customer regarding configuration layout preferences.

Figure 1:
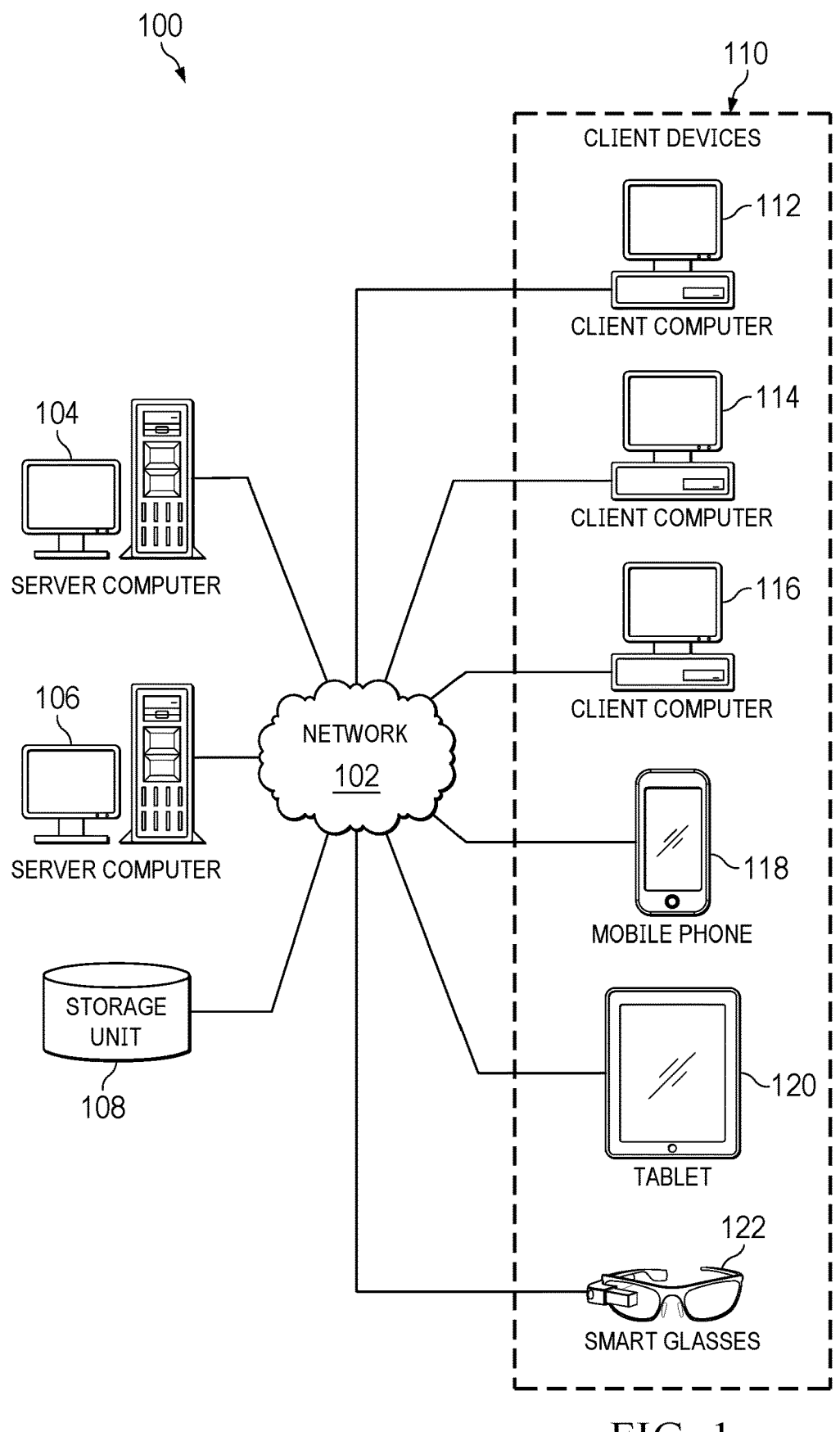
FIG. 1 is a pictorial representation of a network of data processing systems in which illustrative embodiments can be implemented.

With reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 include client computers 112, 114, and 116. Client devices 110 can also include other types of client devices such as mobile phone 118, tablet computer 120, and smart glasses 122.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

Figure 2:
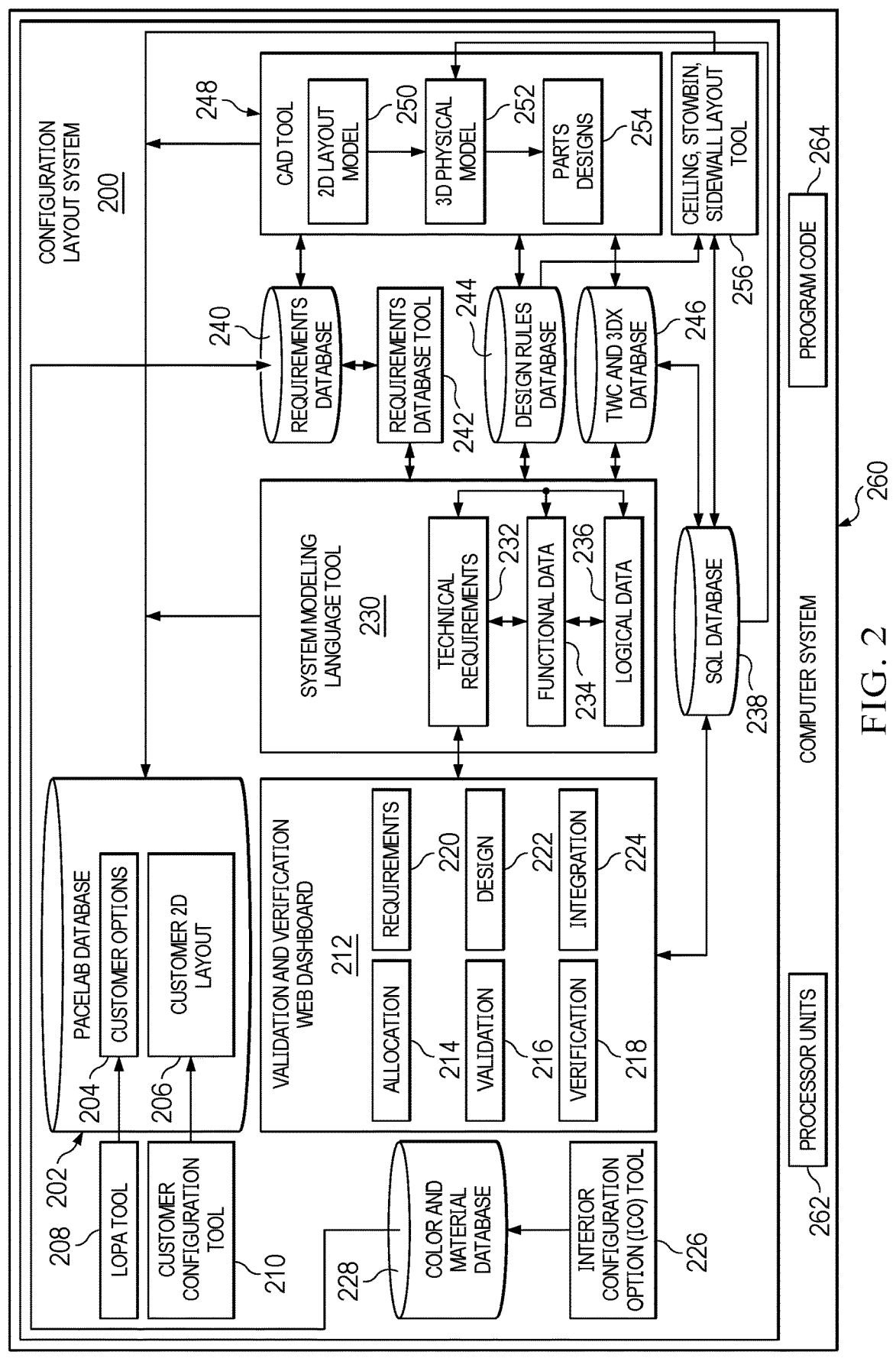
FIG. 2 is an illustration of a block diagram of a configuration layout system in accordance with an illustrative embodiment.

With reference now to FIG. 2, an illustration a block diagram of a configuration layout system is depicted in accordance with an illustrative embodiment. In this illustrative example, configuration layout system 200 includes components that can be implemented in hardware such as the hardware shown in network data processing system 100 in FIG. 1.

Configuration layout system 200 is able to automatically create requirements, functional, logical, and physical models using approved customer configuration options input data.

Configuration layout system 200 comprises a database 202 for an aircraft customer configuration interior arrangement model tool such as Pacelab, which contains customer options 204 and a customer-supplied two dimensional (2D) layout 206 for a vehicle such as an aircraft. Customer options 204 can be selected by a customer from an options list using a customer configuration tool 210. The customer might create the customer 2D layout 206 with a Layout of Passenger Accommodations (LOPA) tool 208. Configuration layout system 200 automatically creates physical 3D space reservations using approved customer options 204 and commodities design rules in design rules database 244. Commodities refer to features that may be customized and arranged within a cabin layout according to customer preferences. Examples of commodities include seats, lavatories, galleys, closets, and entertainment systems.

The customer can also use an interior configuration option (ICO) tool 226 to enter choices into a color and material database 228.

These selections and input from the customer take the form of text documents, which are pulled into a system models language (SysML) tool 230 such as, e.g., Magic Systems of Systems Architect. SysML tool 230 provides requirement, functional, and logical (RFL) capabilities related to commodities within the configuration layout. SysML 230 interacts with requirements database tool 242 to determine technical requirements 232 for the customer 2D layout 206 and customer options 204 stored in a requirements database 240. An example of requirements database tool 242 is IBM® DOORS, which provides the ability to capture, trace, analyze, and manage changes to information related to the technical requirements 232. Each commodity in a configuration layout (e.g., seats, galley, lavatory, etc.) has a number of technical requirements 232 related to their installation, which can be conveyed and tracked in a requirement matrix and table (see FIG. 3).

Requirements database tool 242 can provide technical requirements 232 related to several categories such as, e.g., airline repair and overall (AR&O), design requirements and objectives (DR&O), airplane-level functional hazard assessment (AFHA), system functional hazard assessment (SFHA), Food and Drug Administration (FDA) requirements, customer requirements, etc.

SysML tool 230 helps determine functional data 234 related to commodities of the configuration layout. Functional data relates to attendant elements that must accompany the installation of a commodity in the layout. For example, the installation of a galley in an aircraft also entails the provision of electricity and water supply. The functional data 234 can be presented in activity diagrams (see FIG. 4). Configuration layout system 200 can automatically create a functional interface node (input and output) using approved customer options 204 and commodities design rules in design rules database 244.

Figure 5:
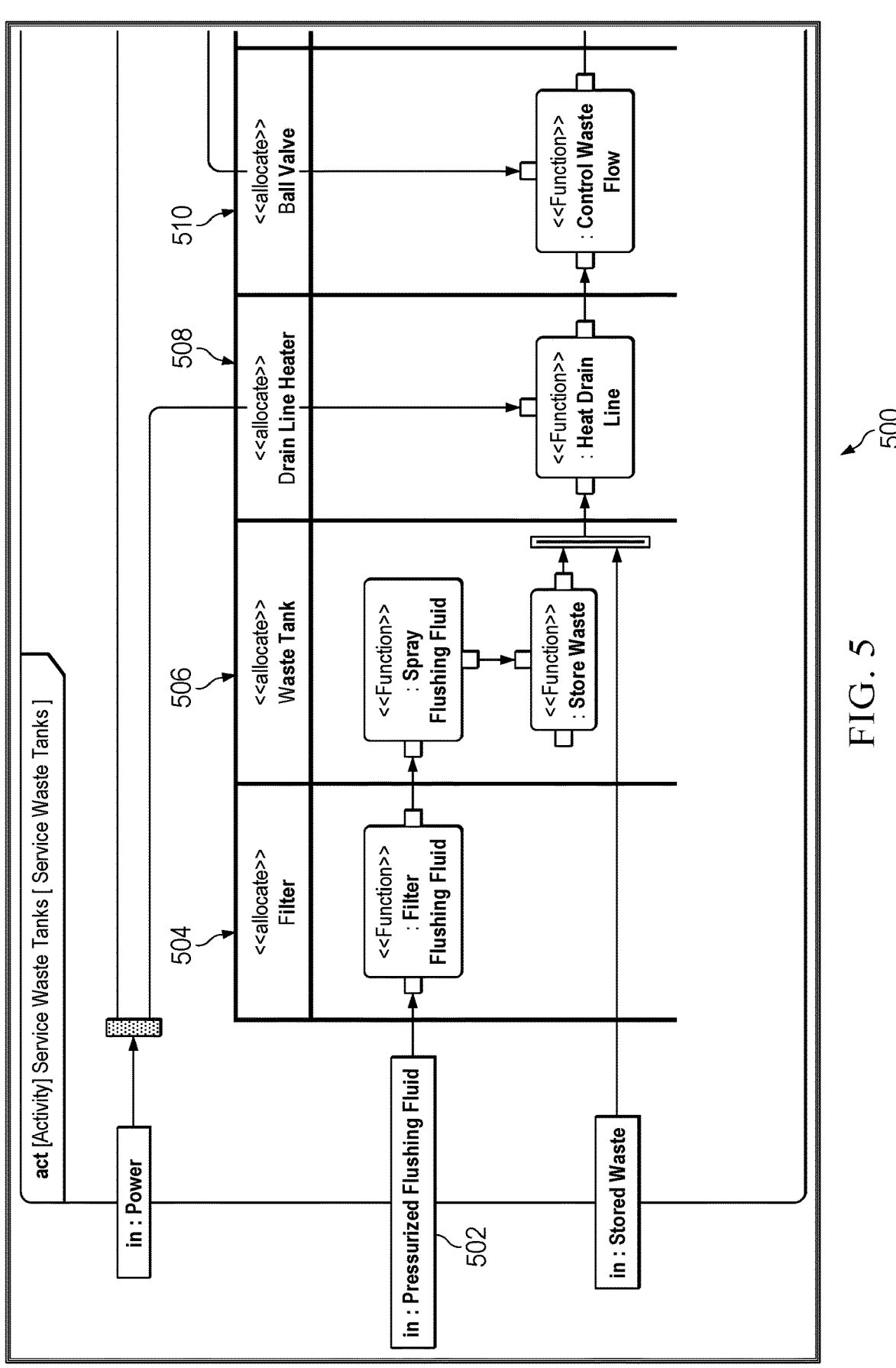
FIG. 5 depicts a logical diagram in accordance with an illustrative embodiment.

Logical data 236 describes the operational interaction of components in a configuration layout, which can be present in block diagrams (see FIG. 5). Given standard elements and structural constraints within a vehicle such as an airplane, as well as the features of the commodity itself, logical data 236 takes into account how the commodity needs to be installed, how its installment interacts with and affects other commodities and systems, and how the other commodities and systems interact with and affect the installation of the commodity. Configuration layout system 200 can automatically connect logical interfaces to logical data 236 using approved customer options 204 and commodities design rules in design rules database 244.

SysML tool 230 also provides connection to Team Work Cloud (TWC) and 3DX® database 246. 3DX® is a business and innovation platform that provides organizations with a holistic, real-time vision of business activity and the ecosystem part of the SysML tool 230.

SysML tool 230 pushes customer technical requirements 232, functional data 234, and logical data 236 to computer assisted design (CAD) tool 248. CAD tool 248 also receives design rules data from a design rules database 244. From this data, CAD tool 248 is able to automatically create a physical 2D layout model 250 of the customer configuration (see FIG. 6). CAD tool 248 can then automatically create a 3D physical model 252 of the configuration layout from the 2D layout model 250 (see FIG. 7).

Configuration layout system 200 can automatically connect all data from technical requirements 232, functional data 234, and logical data 236 to 3D physical model 252 according to a space reservation model tree in the approved customer options 204.

The 2D layout model 250 and 3D physical model 252 can be pushed to the Pacelab database 202 for customer validation or modification. Validation and verification dashboard 212 provides a front-end tool for customers to enter their requirements and preferences for the configuration layout as well as to evaluate the 2D layout model 250 and 3D physical model 252 produced by the CAD tool 248 (see FIG. 8). Validation and verification dashboard 212 is a web-based model-based requirement engineering (MBRE) tool that utilizes a true single source database from SysML. Validation and verification dashboard 212 interacts with TWC and 3DX database 246 through structured query language (SQL) database 238. Validation and verification dashboard 212 provides the technical advantage of allowing a user to interact with and use SysML tool 230 without having to learn and know SysML.

The validation and verification dashboard 212 automates and provides traceability of design milestone requirements throughout the design process and enables automatic creation of new customer projects. These milestones include allocation 214, validation 216, verification 218, requirements 220, design 222, and integration 224. Validation and verification dashboard 212 provides technical requirements traceability, design requirement traceability, color and material specification traceability, specification control drawings and interface control drawings traceability.

SysML tool 230 deals specifically with the configuration layout of commodities such as seats, galleys, and lavatories. Ceiling, stowbin, and sidewall layout tool 256 provides the remaining elements of the vehicle that form the context within which the commodities have to fit (see FIG. 8). Ceiling, stowbin, and sidewall layout tool 256 interacts with designs rule database 244 and SQL database 238 to provide input to Pacelab database 202.

Configuration layout system 200 automatically pulls all requirements 220 from the requirements database 240 according to customer options 204 and assigns requirements using validation and verification dashboard 212. Depending on the models produced by CAD tool 248, which incorporate RFL constraints from SysML 230, the customer might use validation and verification dashboard 212 to modify the layout design and resubmit it to configuration layout system 200 for redesign.

Upon approval by the customer, CAD tool 248 can create specific parts designs 254 based on the 3D physical model 252.

Configuration layout system 200 can be implemented in software, hardware, firmware, or a combination thereof. When software is used, the operations performed by configuration layout system 200 can be implemented in program code configured to run on hardware, such as a processor unit. When firmware is used, the operations performed by configuration layout system 200 can be implemented in program code and data and stored in persistent memory to run on a processor unit. When hardware is employed, the hardware can include circuits that operate to perform the operations in configuration layout system 200.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 260 is a physical hardware system and includes one or more data processing systems. When more than one data processing system is present in computer system 260, those data processing systems are in communication with each other using a communications medium. The communications medium can be a network. The data processing systems can be selected from at least one of a computer, a server computer, a tablet computer, or some other suitable data processing system.

As depicted, computer system 260 includes a number of processor units 262 that are capable of executing program code 264 implementing processes in the illustrative examples. As used herein a processor unit in the number of processor units 262 is a hardware device and is comprised of hardware circuits such as those on an integrated circuit that respond and process instructions and program code that operate a computer. When a number of processor units 262 execute program code 264 for a process, the number of processor units 262 is one or more processor units that can be on the same computer or on different computers. In other words, the process can be distributed between processor units on the same or different computers in a computer system. Further, the number of processor units 262 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

Figure 3:
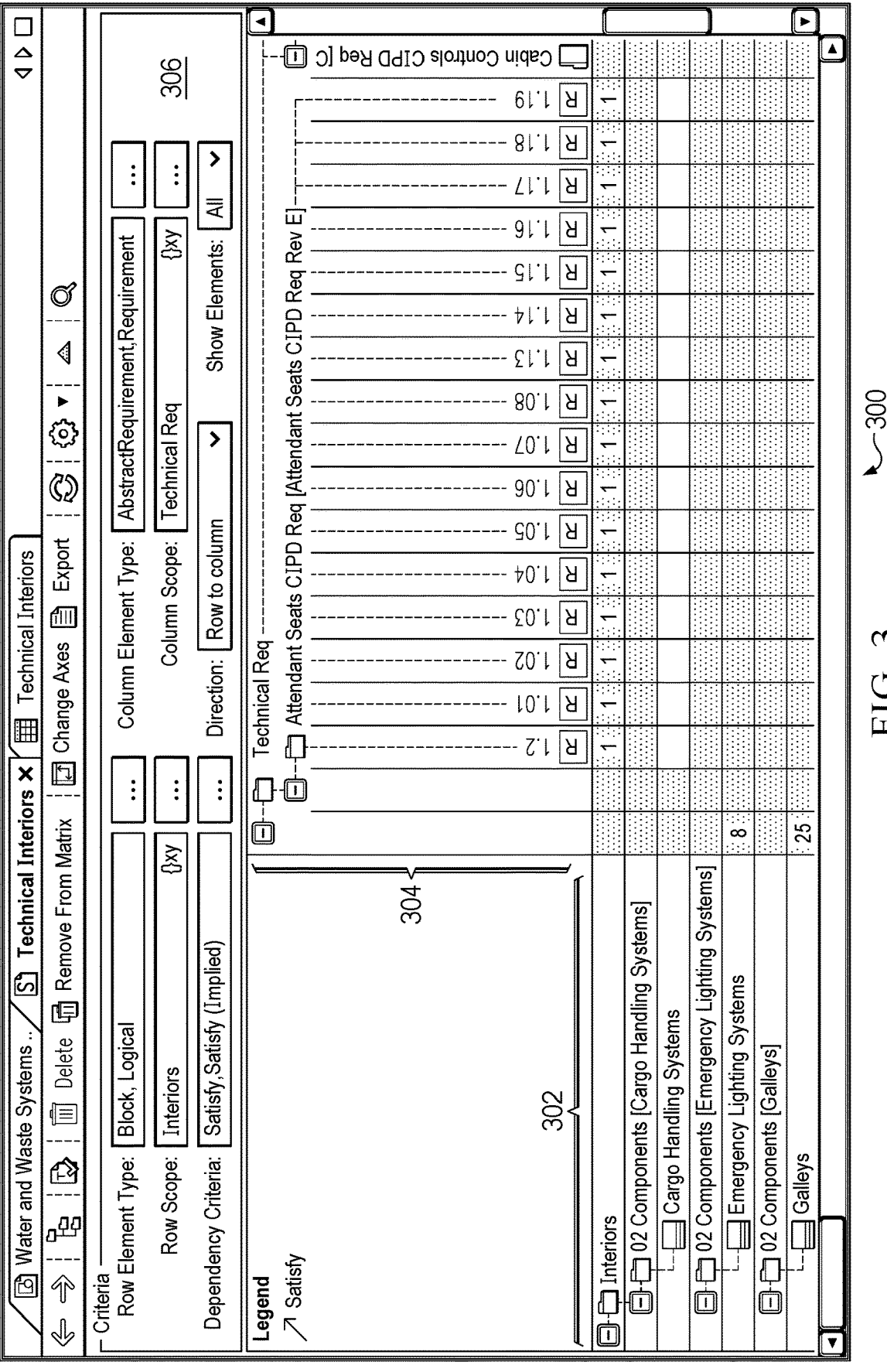
FIG. 3 illustrates an example technical requirements matrix in accordance with an illustrative embodiment.

FIG. 3 illustrates an example technical requirements matrix in accordance with an illustrative embodiment. Requirements matrix 300 displays respective technical requirements for each design element in the configuration. In the present example, row scope 302 covers interior configuration elements, and column scope 304 lists the associated technical requirements. Interface toolbar 306 allows the user to change the display specifics according to need.

Requirements matrix 300 organizes the technical requirements across different requirement levels from the airplane level down to subsystem level.

Figure 4:
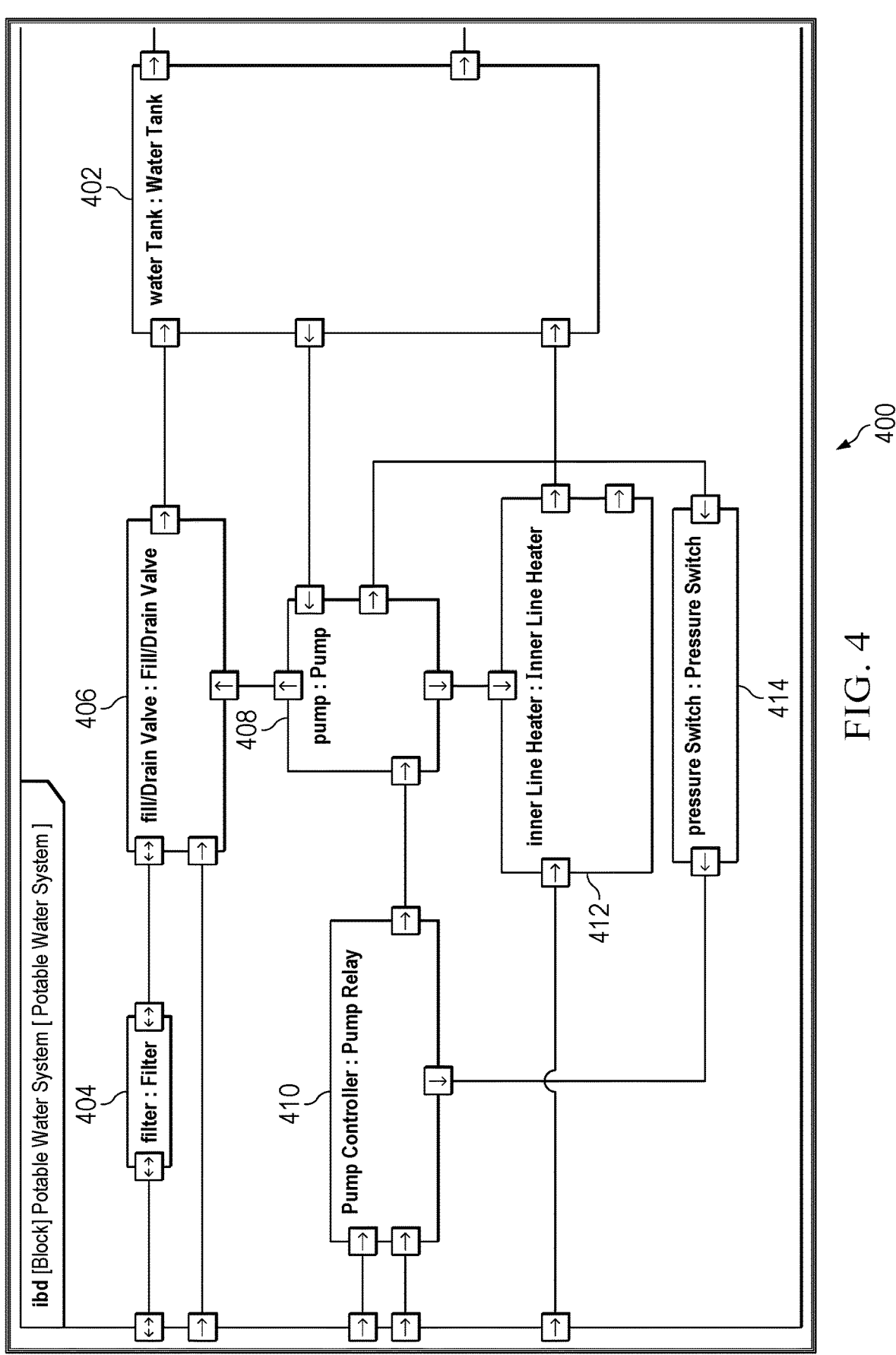
FIG. 4 depicts an example functional diagram in accordance with an illustrative embodiment.

FIG. 4 depicts an example functional diagram in accordance with an illustrative embodiment. In the present example, functional diagram 400 illustrates elements of a potable water system according to functional data such as functional data 234 in FIG. 2. The customer might add a water tank 402 to the configuration. The SysML then determines the additional elements that accompany the installation of the water tank including a filter 404, fill/drain valve 406, pump 408, pump relay 410, inner line heater 412, and pressure switch 414. These additional elements impose constraints on the installation of the water tank 402 in the layout.

FIG. 5 depicts a logical diagram in accordance with an illustrative embodiment. In the present example, logical diagram 500 illustrates the operational interaction between elements of service waste tanks according to logical data such as logical data 236 in FIG. 2. Logical diagram 500 illustrates the sequence of pressurized flushing fluid moving through a filter 504, waste tank 506, drain line heater 508, and ball valve 510. Logical diagram 500 also denotes the functions provided by each element in the logical sequence.

The functional and logical data such as that provided by function diagram 400 and logical diagram 500 identify how and where elements of commodities are connected before proceeding to construction of the 2D and 3D models. The functional and logical data present connectivity in SysML and work within the constraints of elements in the vehicle design that do not vary with the customer preferences.

Using the above examples of a potable water and vacuum waste system, the functional and logical data take into account that the locations of elements such as, e.g., water tanks, water pumps, waste tanks, vacuum blowers, and service panels are given for a particular model of airplane and not subject to customer preferences. The functional and logical data generated by the SysML tool take these constraints into account prior to modeling the physical layout.

Figure 6:
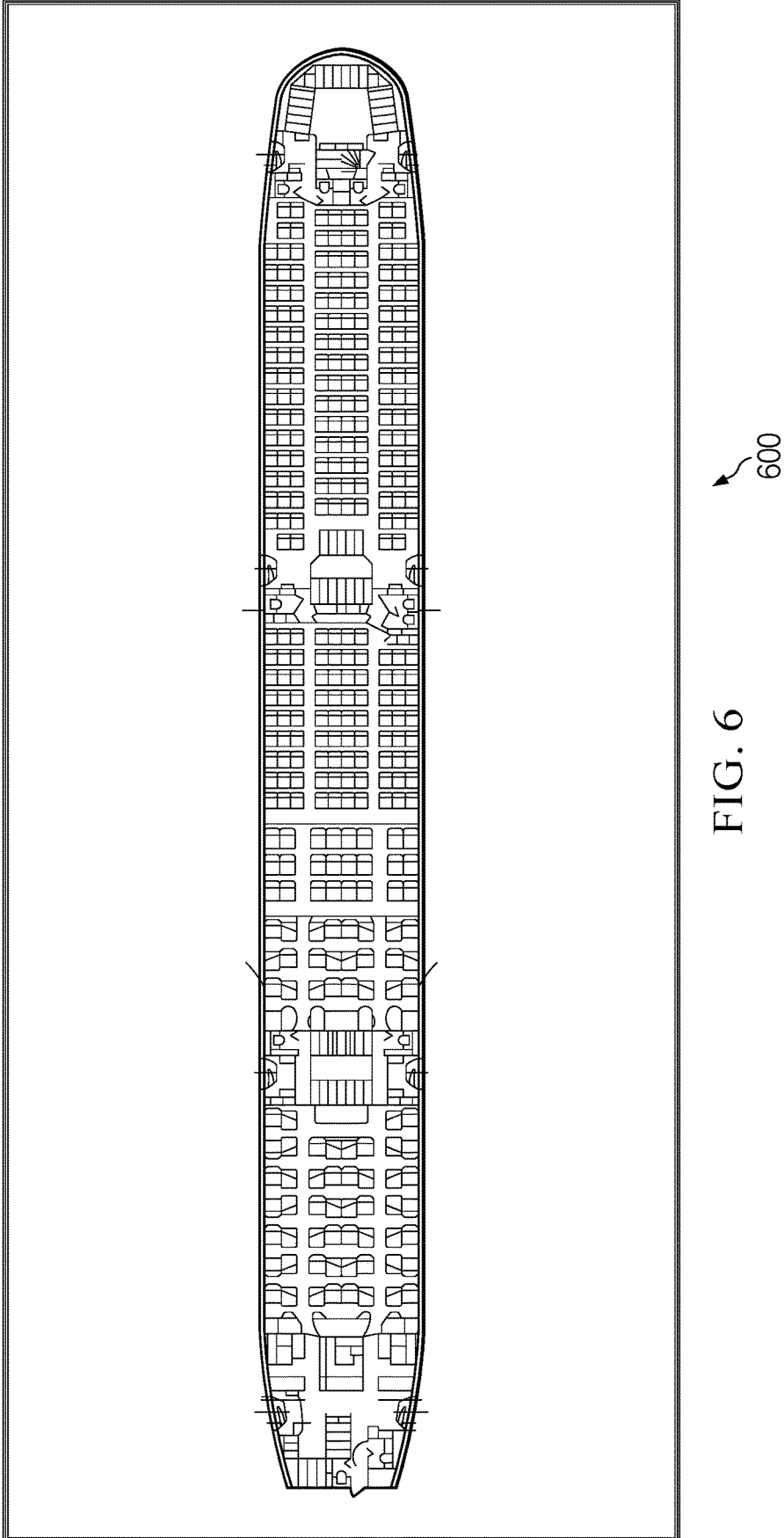
FIG. 6 depicts a 2D layout model in accordance with an illustrative embodiment.

FIG. 6 depicts a 2D layout model in accordance with an illustrative embodiment. 2D layout model 600 is an example of 2D layout model 250 produced by CAD tool 248 according to input from SysML 230 and design rules database 244.

Figure 7:
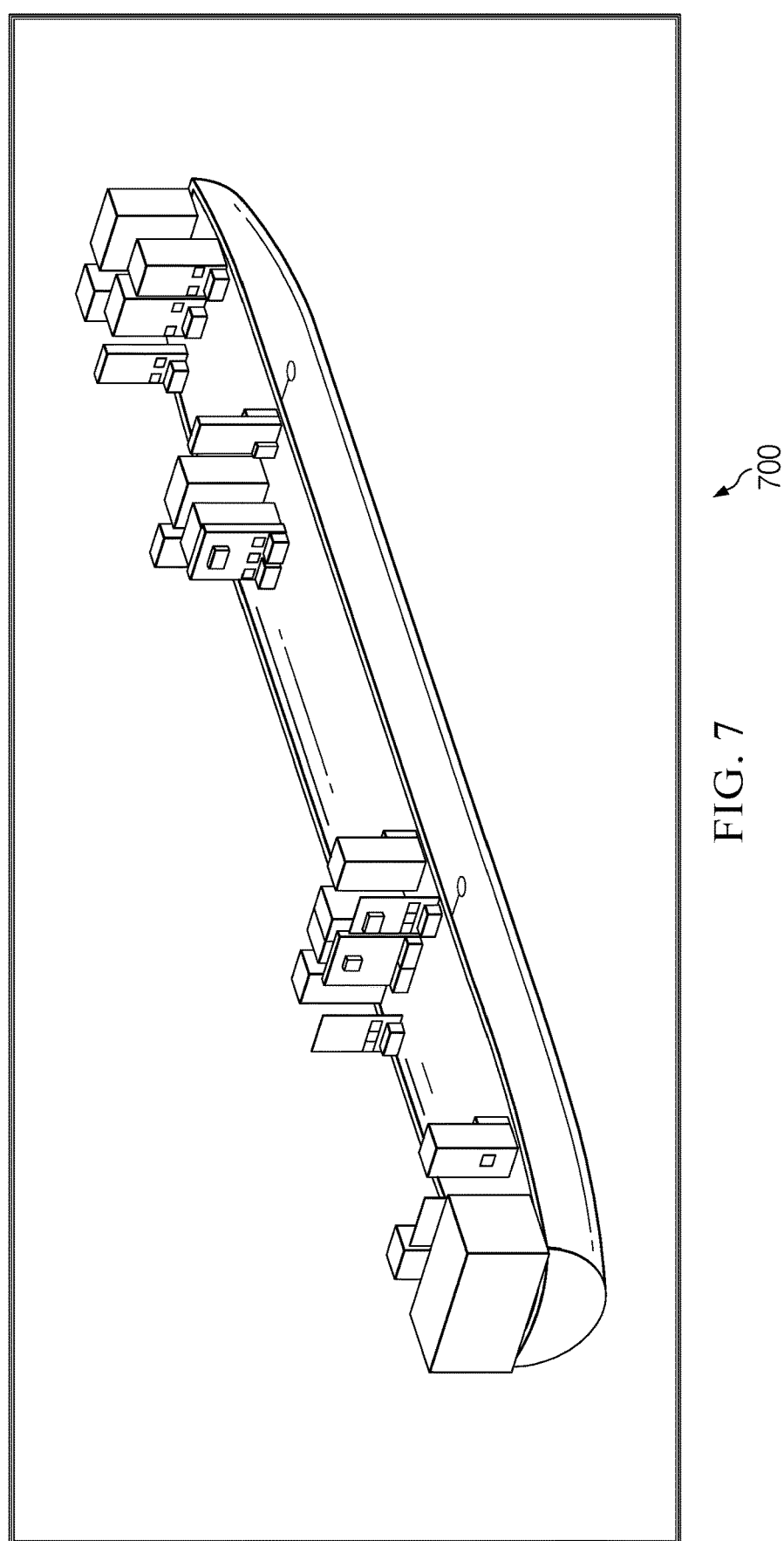
FIG. 7 depicts a 3D physical model in accordance with an illustrative embodiment.

FIG. 7 depicts a 3D physical model in accordance with an illustrative embodiment. 3D physical model 700 is an example of 3D physical model 252 generated by CAD tool 248 from 2D layout model 250.

Figure 8:
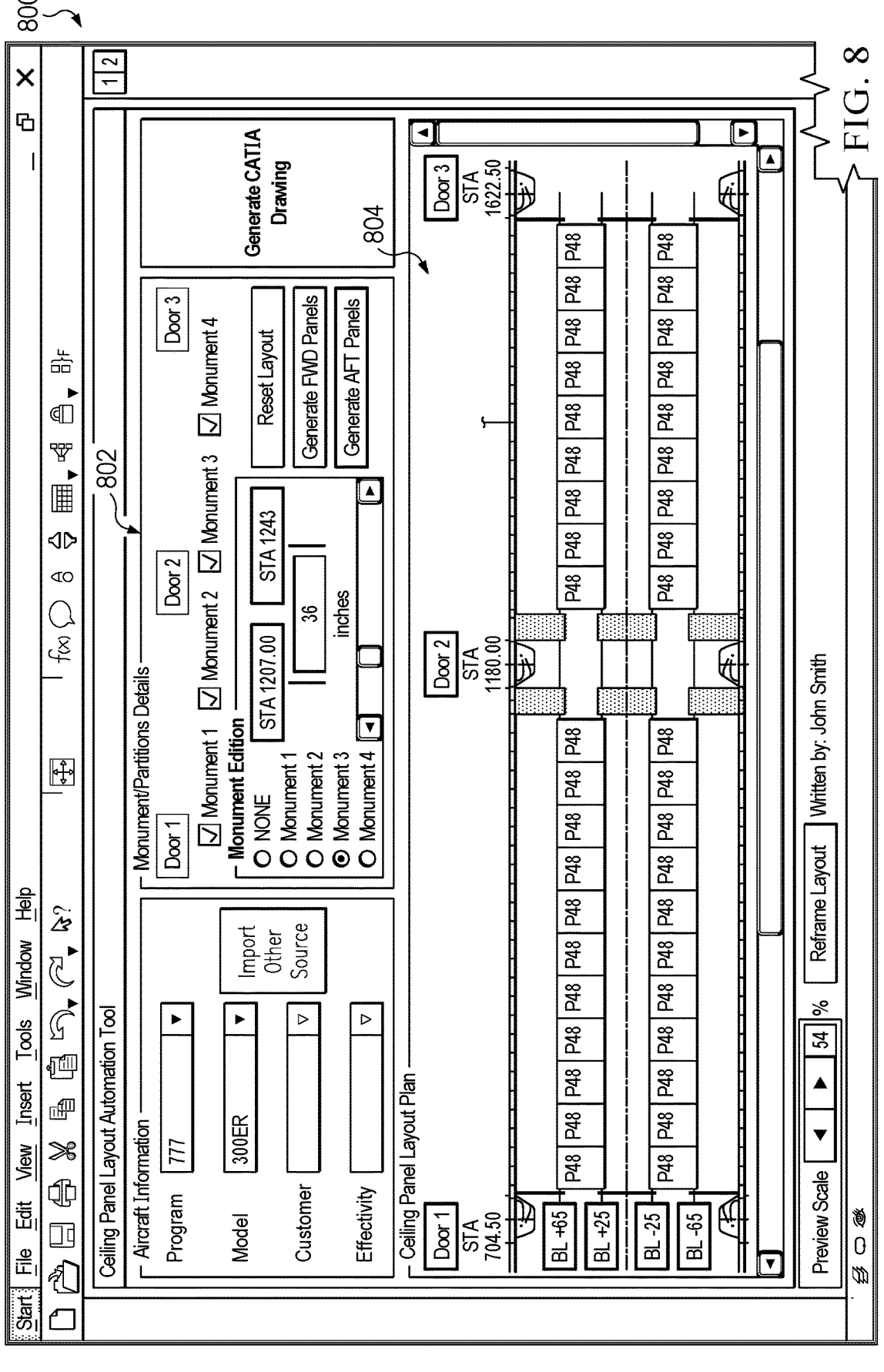
FIG. 8 depicts a diagram illustrating a customer dashboard in accordance with an illustrative embodiment.

FIG. 8 depicts a diagram illustrating a customer dashboard in accordance with an illustrative embodiment. Dashboard 800 is an example of dashboard 212 in FIG. 2. Toolbar 802 in dashboard 800 allows the customer to select and customize configuration elements according to the model of vehicle/aircraft. As the customer adds and adjusts elements for the configuration, the layout is shown in display area 804. Also shown in display area 804 are the additional features of the airplane (e.g., stowbins P48) provided by input from the ceiling, stowbin, and sidewall layout tool 256 in FIG. 2.

FIG. 9 depicts a flowchart of a process for creating a customer layout configuration of a vehicle in accordance with an illustrative embodiment. Process 900 can be implemented in hardware, software, or both. When implemented in software, the process can take the form of program code that is run by one of more processor units located in one or more hardware devices in one or more computer systems. For example, process 900 can be implemented in configuration layout system 200 in computer system 260 in FIG. 2.

Process 900 begins by pulling, from a customer database, a number of text documents that specify a customer's preferences for the layout configuration (operation 902). Customer preferences might comprise at least one of two-dimensional interior arrangements, customer configuration options list, and color and material.

Process 900 determines technical requirements according to a requirement database tool based on the customer preferences (operation 904). Process 900 also determines functional data and logical data according to a system architecture modeling tool based on the customer preferences (operation 906). The technical requirements, functional data, and logical data may be determined via customer configuration options.

Process 900 then generates a physical layout model of the vehicle according to the customer preferences in the text documents within constraints of the technical requirements, functional data, and logical data (operation 908). The physical layout model might comprise a two-dimensional layout model.

Process 900 might generate a three-dimensional model from the two-dimensional layout model (operation 910).

Process 900 might add the technical requirements, functional data, and logical data to a customer model configuration tree (operation 912).

Process 900 provides the physical layout model to the customer for validation or modification of the customer preferences via a dashboard interface (operation 914).

Responsive to modification of the customer preferences (operation 914), process 900 returns to operation 902. If there are no modifications from the customer, the physical layout model is validated (operation 916). Process 900 then ends.

The flowchart and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 10:
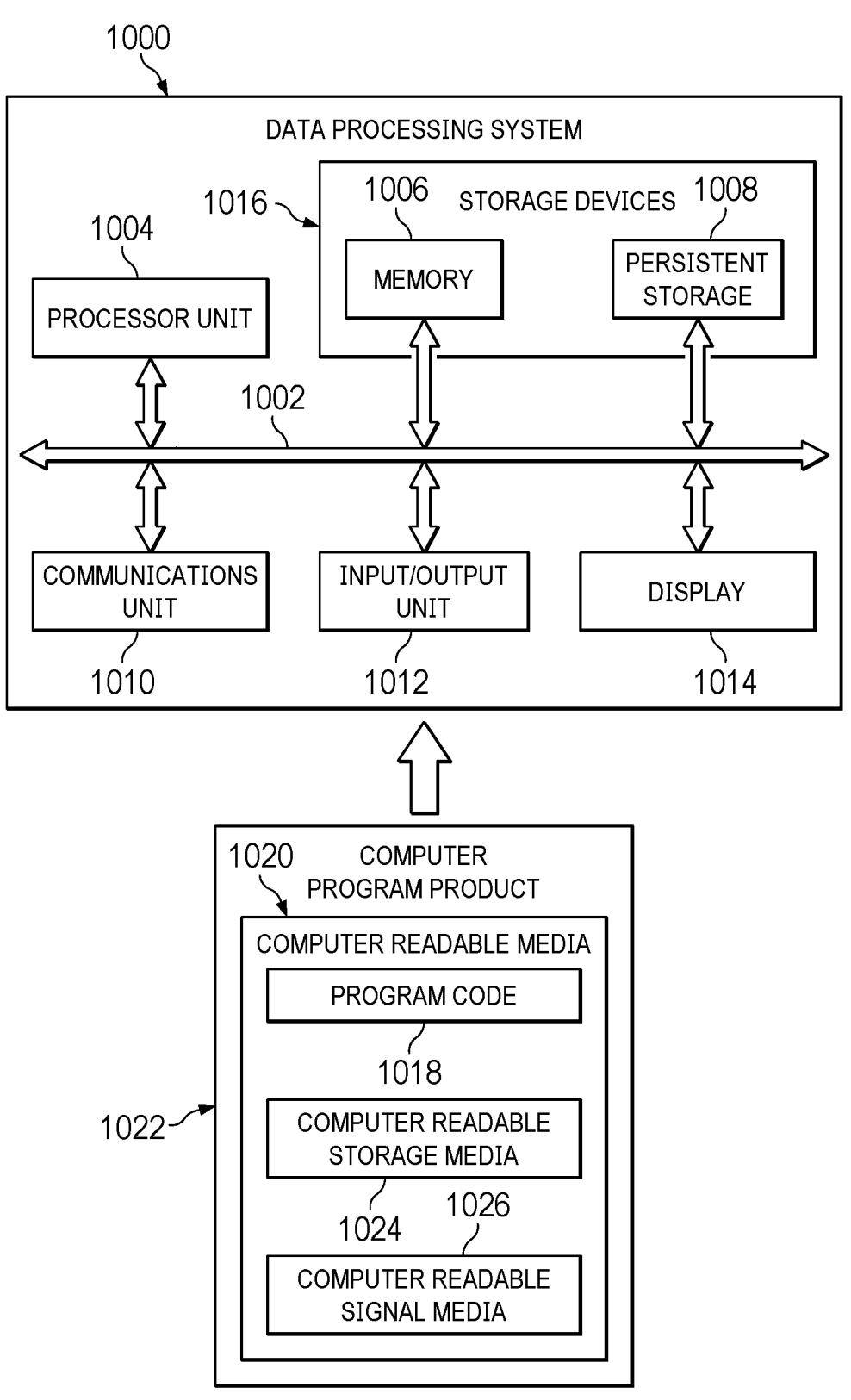
FIG. 10 is an illustration of a block diagram of a data processing system in accordance with an illustrative embodiment.

Turning now to FIG. 10, an illustration of a block diagram of a data processing system is depicted in accordance with an illustrative embodiment. Data processing system 1000 may be used to implement server computers 104 and 106 and client devices 110 in FIG. 1, as well as computer system 260 in FIG. 2. In this illustrative example, data processing system 1000 includes communications framework 1002, which provides communications between processor unit 1004, memory 1006, persistent storage 1008, communications unit 1010, input/output (I/O) unit 1012, and display 1014. In this example, communications framework 1002 takes the form of a bus system.

Processor unit 1004 serves to execute instructions for software that may be loaded into memory 1006. Processor unit 1004 may be a number of processors, a multi-processor core, or some other type of processor, depending on the particular implementation. In an embodiment, processor unit 1004 comprises one or more conventional general-purpose central processing units (CPUs). In an alternate embodiment, processor unit 1004 comprises one or more graphical processing units (GPUs).

Memory 1006 and persistent storage 1008 are examples of storage devices 1016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1016 may also be referred to as computer-readable storage devices in these illustrative examples. Memory 1006, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008. Communications unit 1010, in these illustrative examples, provides for data communications with other data processing systems or devices. In these illustrative examples, communications unit 1010 is a network interface card.

Input/output unit 1012 allows for input and output of data with other devices that may be connected to data processing system 1000. For example, input/output unit 1012 may provide a connection for user input through at least one of a keyboard, a mouse, or some other suitable input device. Further, input/output unit 1012 may send output to a printer. Display 1014 provides a mechanism to display information to a user.

Instructions for at least one of the operating system, applications, or programs may be located in storage devices 1016, which are in communication with processor unit 1004 through communications framework 1002. The processes of the different embodiments may be performed by processor unit 1004 using computer-implemented instructions, which may be located in a memory, such as memory 1006.

These instructions are referred to as program code, computer-usable program code, or computer-readable program code that may be read and executed by a processor in processor unit 1004. The program code in the different embodiments may be embodied on different physical or computer-readable storage media, such as memory 1006 or persistent storage 1008.

Program code 1018 is located in a functional form on computer-readable media 1020 that is selectively removable and may be loaded onto or transferred to data processing system 1000 for execution by processor unit 1004. Program code 1018 and computer-readable media 1020 form computer program product 1022 in these illustrative examples. In one example, computer-readable media 1020 may be computer-readable storage media 1024 or computer-readable signal media 1026.

In these illustrative examples, computer-readable storage media 1024 is a physical or tangible storage device used to store program code 1018 rather than a medium that propagates or transmits program code 1018. Computer readable storage media 1024, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1018 may be transferred to data processing system 1000 using computer-readable signal media 1026. Computer-readable signal media 1026 may be, for example, a propagated data signal containing program code 1018. For example, computer-readable signal media 1026 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1000 are not meant to provide architectural limitations to the manner in which different embodiments may be implemented. The different illustrative embodiments may be implemented in a data processing system including components in addition to or in place of those illustrated for data processing system 1000. Other components shown in FIG. 10 can be varied from the illustrative examples shown. The different embodiments may be implemented using any hardware device or system capable of running program code 1018.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As used herein, "a number of" when used with reference to items, means one or more items. For example, "a number of different types of networks" is one or more different types of networks. In illustrative example, a "set of" as used with reference items means one or more items. For example, a set of metrics is one or more of the metrics.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method of creating a customer layout configuration of a vehicle, the method comprising:

using a number of processors to perform:

pulling, from a customer database, a number of text documents that specify a customer's preferences for the layout configuration that includes one or more components;

determining technical requirements according to a requirement database tool based on the customer preferences and technical requirements related to the layout configuration included in a requirements database, wherein the technical requirements include information related to installation of the one or more components of the layout configuration;

determining functional data and logical data according to a system architecture modeling tool based on the customer preferences and design rules related to the layout configuration included in a design rules database, wherein the functional data includes attendant elements that must accompany the one or more components of the layout configuration and the logical data includes operation interactions of the one or more components of the layout configuration; and generating a computer-aided physical layout model of the vehicle according to the customer preferences in the text documents within constraints of the technical requirements, functional data, and logical data using model-based system engineering that pulls together the customer preferences, the functional data, and the logical data;

providing the computer-aided physical layout model to the customer for validation or modification of the customer preferences via a dashboard interface;

generating a three-dimensional model from the computer-aided physical layout model; and creating specific parts designs for the vehicle based on the three-dimensional model.

2. The method of claim 1, wherein the computer-aided physical layout model comprises a two-dimensional layout model.

3. The method of claim 1, further comprising performing the pulling, determining technical requirements, determining functional data and logical data, generating the computer-aided physical layout model steps for the modified customer preferences.

4. The method of claim 3, further comprising providing the three-dimensional model to the customer for validation or modification of the customer preferences via the dashboard interface.

5. The method of claim 1, further comprising adding the technical requirements, functional data, and logical data to a customer model configuration tree.

6. The method of claim 1, wherein the customer preferences comprise at least one of:

two-dimensional interior arrangements;

customer configuration options list; or color and material.

7. The method of claim 1, wherein the technical requirements, functional data, and logical data are determined via customer configuration options.

8. A system for creating a customer layout configuration of a vehicle, the system comprising:

a storage device that stores program instructions;

one or more processors operably connected to the storage device and configured to execute the program instructions to cause the system to:

pull, from a customer database, a number of text documents that specify a customer's preferences for the layout configuration that includes one or more components;

use model-based system engineering without user interaction to:

determine technical requirements according to a requirement database tool based on the customer preferences and technical requirements related to the layout configuration included in a requirements database, wherein the technical requirements include information related to installation of the one or more components of the layout configuration;

determine functional data and logical data according to a system architecture modeling tool based on the customer preferences and design rules related to the layout configuration included in a design rules database, wherein the functional data includes attendant elements that must accompany the one or more components of the layout configuration and the logical data includes operation interactions of the one or more components of the layout configuration; and generate a computer-aided physical layout model of the vehicle according to the customer preferences in the text documents within constraints of the technical requirements, functional data, and logical data using model-based system engineering that pulls together the customer preferences, the functional data, and the logical data;

provide the computer-aided physical layout model to the customer for validation or modification of the customer preferences via a dashboard interface;

generating a three-dimensional model from the computer-aided physical layout model; and create specific parts designs for the vehicle based on the three-dimensional model.

9. The system of claim 8, wherein the computer-aided physical layout model comprises a two-dimensional layout model.

10. The system of claim 9, further comprising performing the pulling, determining technical requirements, determining functional data and logical data, generating the computer-aided physical layout model steps for the modified customer preferences.

11. The system of claim 10, further comprising providing the three-dimensional model to the customer for validation or modification of the customer preferences via the dashboard interface.

12. The system of claim 8, further comprising adding the technical requirements, functional data, and logical data to a customer model configuration tree.

13. The system of claim 8, wherein the customer preferences comprise at least one of:

two-dimensional interior arrangements;

customer configuration options list; or color and material.

14. The system of claim 8, wherein the technical requirements, functional data, and logical data are determined via customer configuration options.

15. A computer program product for creating a customer layout configuration of a vehicle, the computer program product comprising:

a non-transitory computer-readable storage medium having program instructions embodied thereon, when executed by a processor, to perform the operations of:

pulling, from a customer database, a number of text documents that specify a customer's preferences for the layout configuration that includes one or more components;

using model-based system engineering without user interaction to:

determine technical requirements according to a requirement database tool based on the customer preferences and technical requirements related to the layout configuration included in a requirements database, wherein the technical requirements include information related to installation of the one or more components of the layout configuration;

determine functional data and logical data according to a system architecture modeling tool based on the customer preferences and design rules related to the layout configuration included in a design rules database, wherein the functional data includes attendant elements that must accompany the one or more components of the layout configuration and the logical data includes operation interactions of the one or more components of the layout configuration; and generate a computer-aided physical layout model of the vehicle according to the customer preferences in the text documents within constraints of the technical requirements, functional data, and logical data using model-based system engineering that pulls together the customer preferences, the functional data, and the logical data;

providing the computer-aided physical layout model to the customer for validation or modification of the customer preferences via a dashboard interface;

generating a three-dimensional model from the computer-aided physical layout model; and creating specific parts designs for the vehicle based on the three-dimensional model.

16. The computer program product of claim 15, further comprising performing the pulling, determining technical requirements, determining functional data and logical data, generating the computer-aided physical layout model steps for the modified customer preferences.

17. The computer program product of claim 16, further comprising providing the three-dimensional model to the customer for validation or modification of the customer preferences via the dashboard interface.

18. The computer program product of claim 15, further comprising adding the technical requirements, functional data, and logical data to a customer model configuration tree.

19. The computer program product of claim 15, wherein the customer preferences comprise at least one of:

two-dimensional interior arrangements;

customer configuration options list; or color and material.

20. The computer program product of claim 15, wherein the technical requirements, functional data, and logical data are determined via customer configuration options.

* * * * *